March 3, 1953 E. N. MULLER 2,630,548

CATHODE-RAY SYSTEM

Filed Dec. 3, 1938

Inventor

Egon Nicolas Muller

Patented Mar. 3, 1953 2,630,548

UNITED STATES PATENT OFFICE 2,630,548

CATHODE-RAY SYSTEM

Egon Nicolas Muller, Esch/Alzette, Luxemburg

Application December 3, 1938, Serial No. 243,759
In Great Britain December 4, 1937

20 Claims. (Cl. 315—21)

Figures 1A, 1B, 2, 3, 4, 4A:
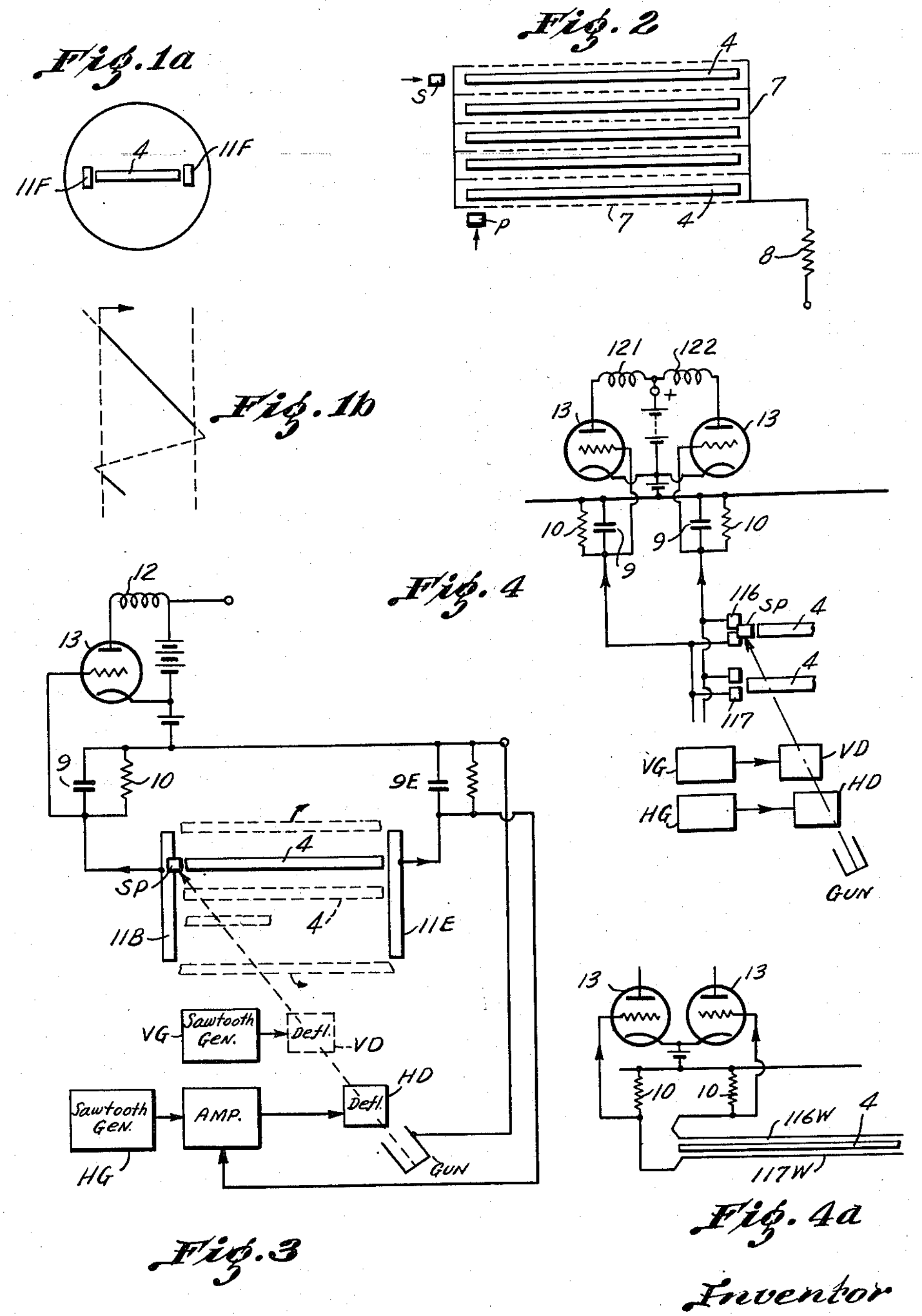

My present invention applies to cathode ray and like systems for use in television, in facsimile transmission systems, in sound transmission or recording, and for various more or less related purposes. The term "signal" will hereinafter be used as a generic expression including image or message signals, sound signals and the like.

It is an essential object of this invention to provide means for facilitating and maintaining accurate adjustments in systems of the above character. As applied to systems wherein a scanning beam or system of beams cooperates with an electronic image or a plurality of image zones etc. or with a system of record tracks for storing signal energy relative to certain image points this implies that the initial and/or final positions of the scanning beam or beams under the influence of the scanning (deflecting) potentials must exactly assume the required positions despite the effects of various causes tending to upset in more or less serious proportions the proper adjustments, such as variations in the supply voltage or aging of the tubes or non-uniformity of the scanning amplitude of the deflecting potentials or interfering extraneous magnetic stray fields etc.

It will be clear that in present-day television and other systems extremely high degrees of synchronism are frequently required, while the exact relative positions of the scanning beam or beams and of the electronic image or images etc. to be scanned, cannot be defined by the sole effect of synchronization of conventional character, and depend largely on the apparatus and operating potentials used. As applied for instance to television and like systems wherein a plurality of image zones or electronic images must register exactly in view of the simultaneous transmission (or reproduction) of the plurality of zones, it is important that the above errors as concerns the various image parts or zones be lower than one image point and preferably not in excess of a fraction of one image point. The requirements are particularly high in those television systems wherein intermediate scanning and like processes have to take place in the transmitter and/or receiver.

The above objects are easily attained in accordance with the invention by the use of simple, reliable and comparatively inexpensive means which preferably provide automatic adjustment. As applied to a scanning cathode-ray beam adjusting or correcting means in accordance with the invention do not interfere with the proper scanning operation or timing conditions to which the scanning beam may be subjected.

It has heretofore been proposed in connection with color television to guide a cathode beam onto and along a rail-shaped fluorescent target by means of electrostatic attraction. Such a system besides being expensive or complicated or requiring appreciable control power is not neither truly accurate nor suitable for adjusting the positioning or width of an image as a whole e. g. the raster swept out by a cathode beam. A typical system of automatic adjustment in accordance with the invention comprises, correcting the positioning and/or width of a trace or raster swept out by a scanning cathode-ray beam.

Another typical system comprises, correcting undesired deviation of a scanning cathode-ray beam from a preselected scanning path.

Further systems comprise, accurately positioning or guiding a cathode-ray beam at any of a plurality of target portions or scanning paths onto which the beam is coarsely deflected by main deflection means.

The above system for automaticaly providing accurate positional adjustment in cathode-ray apparatus by way of example will be described in connection with devices for ensuring efficient and accurate transmission and/or reproduction of well-defined images etc. by making use of scan transformers. Such apparatus in the main is characterized by a storage step in which signal energy derived from a transmitter station, or from a preliminary scanning step at the transmitter etc. is stored in a bank of minute condensers, or in some instances on a luminescent track having marked afterglow, and such energy is picked up or utilized in a subsequent step wherein scanning is in a desired fashion.

Further objects of the invention will result from the following detailed description, which is illustrated in Figs. 1*a*–4*a* of which:

Fig. 1*a* illustrates a typical scan transformer arrangement using cathode-ray tubes, including a "monitoring" or "control" track;

Fig. 1*b* shows a typical scanning wave-form for said arrangement;

Fig. 2 shows alternative forms of scan transformer arrangements using an alternative form of storage track and scanning path; while Figs. 3, 4 illustrate automatic control of cathode ray systems for correcting undesired shift or deviation in the direction of the scanning path and in the transverse direction respectively, as applied to scan transformer systems.

Reference should now be had to Fig. 3 wherein a cathode beam adapted to move over a record track of the type shown in Fig. 1a is provided with means for operating automatic adjustment of the initial and final spot positions. To simplify the explanation it is believed preferable to first describe and explain in detail the control system which secures a correct adjustment inasmuch as the extreme left of the storage structure 4 is concerned, whereat the beam will be supposed to "start." As shown in schematic manner the cathode-ray tube includes means designated GUN for developing the beam by the aid of electrostatic or electromagnetic forces of well-known character (and as desired modulating same as, for example, by signals from a television transmitter station). For the details of arrangements of like character reference may be had, for example, to a series of articles in the periodical, "Television and Shortwave World," entitled, "The A. B. C. of the Cathode-Ray Tube" by G. Parr in particular part III entitled "Drawing Patterns with Electrons," on pages 321–323 of the issue of June 1935, No. 88, vol. VIII.

Said beam is deflected over the target structure including "storage track" 4 by the aid of electrostatic or electromagnetic forces of well-known character including the deflection elements (plates or coils) schematically shown at HD fed from a generator of sawtooth scanning waveforms schematically shown at HS conveniently through the intermediary of an amplifier designated AMP. For the details of such an arrangement of well-known character reference may be had, for example, to two articles in the periodical "Television and Shortwave World" entitled: "For the Beginner: Simple Facts about Time Bases" by J. H. Reyner, issue of June 1936 (No. 100, vol. IX), pages 336, 184 and issue of March 1936 (No. 97, vol. IX), pages 177, 178, 181, respectively; which describe various arrangements with and without the application of synchronism by a transmitter, with provision for adjustment of sweep periodicity, amplitude, centering and the like.

Besides deflection in the "fast" or "horizontal" scanning direction as just considered, provision may be made for deflection in the direction substantially at right-angles i. e., in the "low-speed" or "vertical" direction by a similar generator VG and deflection means VD whereby successive parallel lines may be traced out according to well-known systems design; reference may be had in this connection to an article in "Television and Short Wave World," entitled "The Cathode-Ray Scanning Circuit for Beginners" by G. Parr, issue of May 1936 (No. 99, vol. IX) pages 289, 290, 320. It will first be supposed that the cathode ray is under the influence of a single scanning potential or force, of saw-tooth wave form throughout its flight being deflected over one linear path as specifically illustrated in Figs. 1a, 1b.

Fig. 1a aids in illustrating the operating conditions whereby the beam, besides moving across the "record track" 4 carries out a slight additional sweep movement over the adjoining target portions designated 11f, 11F in Fig. 1a; the latter, incidentally, might yield distinctive light emission upon being struck by the beam, for monitoring purposes. It is not necessary, for the purpose of the present invention, to consider the details of construction of track 4.

Fig. 1b may be looked upon as denoting the general form of movement of the scanning beam and the sawtooth deflection waveform, time being indicated vertically and scanning amplitude horizontally. There is provided a condenser 9 across which is produced and in substance maintained a corrector potential, the condenser preferably being arranged for very quick charging and slow discharge; charging being in response to the regularly recurrent impact of the electronic beam or the like to be controlled onto an appropriate control electrode or structure.

In the particular form shown one such control electrode denoted by the reference 11B (corresponds to the monitoring area 11f in Fig. 1a) is arranged to border the storage tracks near their extreme left-hand track portions, at 11, and consists of a metal rail, or of a metallic deposit or a wire etc., this electrode in the present instance being coated with carbonized substance etc. to keep secondary electron emission low.

In accordance with the arrangement shown the control electrode 11B acts in "uni-directional" fashion, through a form of closed control cycle in such a way as to give rise to deflection in compensatory sense when there is increased impact current.

The condenser 9 shunted by the leak resistor 10 is connected between a desired fixed potential, and the grid of an associated control tube 13, and the active condenser terminal is furthermore directly connected in the instance shown to the control electrode. The anode current of the regulator tube 13 traverses a deflecting coil 12 associated with the storage cathode-ray tube, and which may be specifically provided for that purpose and may have comparatively a few windings only, the same being arranged to deflect the beam toward the left in proportion to the intensity of the anode current through the coil 12.

Normally the negative bias of the tube is fixed at a low value, and the storage spot is arranged, as by rough manual adjustment, not to touch the electrode 11B at any time during its flight as long as coil 12 is inoperative; in actual fact this coil will provide a substantial additional deflection and the spot will be incident on the electrode 11 as soon as it is beginning its course. Accordingly, a substantial negative potential will be set up across the condenser, the charging speed if desired being limited by a resistor 14; the decrease in tube current will reduce the additional deflection so that a small further change (if any) will be imparted to the condenser 9 when the beam or spot *sp* begins a fresh course, and an equilibrium condition is quickly reached and maintained, wherein the spot will but slightly touch the electrode 9 to replace the small charge which leaked away through 10. Of course, the control sensitivity may be arranged to reach a high value whereby the arrangement will in substance be independent from moderate changes in current of the cathode-ray beam; the latter if desired being given a (predetermined) intensity; of course the arrangement is in substance independent from the adjustment of the tube 13 or other operating constants.

Further D.-C. amplifiers may be provided in cascade with the tube 13.

Separate means for correction may if desired be dispensed with and the potential across the condenser 9 may in effect be superimposed to the normal horizontal deflector potentials of the beam and/or to the manual adjustment means for that direction; for instance, injection of a desired correcting potential may be by the aid of an auxiliary rectifier, by applying auxiliary H-F oscillations to the tube 13 which thus serves as a modulator, the said H-F oscillations being lead off from the anode circuit, in view of injection. As above mentioned it may be arranged that the beam has a predetermined intensity when passing over the control electrode; such control may for instance be performed by the use of an additional modulator electrode, or preferably by the use of an injected control potential, the said control potential in either case derived in response to the sudden change in potential (or changed sense of potential variation), which takes place in close proximity of the "peaks" of the saw-tooth scanning potentials, and derived through an appropriately dimensioned transformer or self-inductance, or again through an appropriately dimensioned condenser. Whereas in the particular construction shown the impact current tends to be a minimum, whereby any touch tends to be nearly prevented, the arrangement may alternatively tend to admit a substantially predetermined impact current and width of touch, as by providing a threshold means such as a biased diode or other unidirectional conductor if desired associated with a resistor, in the input circuit of the tube 13 or by biasing this tube beyond cutoff. The electrode structure 11 for providing correction may alternatively be secondary-electron emissive, in which case the flow of current through the coil 12 would be reversed or like small changes in layout had.

An analogous control system in association with a further electrode 11E is provided for adjusting automatically the final position of the scanning beam, whereby to secure automatic marginal control at the extreme right. As shown the regulator potential across an analogous reservoir condenser 9E is for instance caused to vary the gain of amplifier AMP associated with the generator of the scanning potentials. Means for varying the gain of an amplifier (in particular of an amplifier tube) by a potential are well-known in the art for a great variety of applications and, generally speaking are perfectly suitable for the present purpose; the most widely used arrangement uses control of grid bias (optionally in conjunction with so-called variable-mu tube characteristics but this is not essential); reference may be had, for example, to an article in the periodical "Electronics," issue of February 1934, pages 50, 51, entitled, "AVC Applied to Audio Frequency Amplifier Tubes" by J. R. Nelson, which discusses automatic gain control as applied to diverse triodes and pentodes.

It is desirable in most instances to keep the interaction of control of the initial and final spot corrector systems as low as possible, for instance by appropriate circuit design. The time constant might be seriously higher at either 11 or 11E, to prevent "hunting" of the system.

In a practical construction the condenser 10 might be constituted by the input capacity of a tube 13, and the tube 13 may be directly included in the cathode ray tube.

The potentials across the condenser 9 may be made visual, e. g. by switching a visual indicator in the anode circuit of the tube 13, to permit a closer manual adjustment of the system. The operation of this automatic boundary control system does not change appreciably if successive scanning paths occur sequentially over parallel moderately spaced storage tracks as set forth with reference to Fig. 2 and as shown in Fig. 3.

According to a further automatic control system, adjustment is in response to the differential impacts of the electron stream on two contact electrodes, which are associated in normally balanced relation whereby increased impact on one or other trace may give rise to a correcting potential acting in one or other sense to reestablish in substance balance. This system is illustrated in Fig. 4, wherein it is applied to control the position of the spot *sp* in the direction transverse to the lines, whereby to ensure that the spot moves exactly in alignment with the track to be scanned. As shown, discrete contacts are arranged at the extreme left of the horizontal tracks, there being two contacts 116, 117 for each track properly aligned to adjoin same on one side and other respectively. All the contacts for the various tracks may be connected together in alternate order in such a way as to form two outgoing lines to show off vertical deviation or misalignment in one or other sense. Each of these sets of contacts is associated with a control tube arranged as in Fig. 3 and provided with a reservoir condenser system. The anode currents of the two tubes are arranged to flow through an associated coil 121—122 which may be center-tapped or otherwise the magnetic fields of the two part coils connected in opposition. As the spot begins its course at the uppermost storage track, there may be a small deviation from the required position, in the vertical sense, and this will give rise to predominant decrease of anode current in one tube, and to increased current in the other tube, whereby to produce a modified effect of the auxiliary deflecting coil system, this modified effect being of such sense as to tend to repel the beam off the contact whereat there was predominant impact, and onto the other contact; since this would tend to bring about a reversed effect, there will very speedily be reached an equilibrium condition of the respective effects, and the beam will be in substance centred.

Of course the vertical deflecting potential is arranged to be in the main correct, and there will be no substantial further misalignment as the spot reaches the next track or path, and a minute proportion of correction would thus be quickly supplied again.

With the present "compensated" arrangement the extreme position, toward the left, of the beam, may be such as to permit impact through an appreciable amount upon the control contacts (and even beyond), thereby permitting high control sensitivity.

The above automatic control illustrated in Fig. 4 is also very useful if "variable-area" storage is provided wherein the track may be of the mosaic type having high leakage resistance in all dimensions, at least the upper long-side edge is sharply defined, and the storage spot is modulated e. g. by an auxiliary deflector plate pair so that the modulated spot misses the track in more or less pronounced proportion, while a higher pickup beam may be employed for subsequently discharging the whole track. Further improved control in like instances may be provided by controlling the flight of the spot over the whole scanning path. For instance, instead of the discrete contacts 116 there may be wire-shaped electrodes 116W, 117W as shown in Fig. 4*a*, arranged to adjoin the tracks and to provide differential control. It will be obvious that the function of the hold-on condensers 9 (preserving a control voltage during the "no-touch" periods) becomes thereby unimportant or superseded, or "unidirectional" control may be used in conjunction with a single wire adjoining each track or apertured member (e. g. a (grid) structure as in Fig. 2). In multiple-beam systems employing for instance a plurality of cathode-ray beams issued from one gun-structure to scan in unison the scan transformer tracks, only one of the beams need be controlled, during its flight.

In the automatic adjusting arrangement shown in Fig. 3 for use with the scan transformer arrangement illustrated in Fig. 2 a multiple track structure is used which may be framed in all directions by control electrodes.

Framing and other automatic or visual control is also applicable to various other cathode-ray apparatus, for instance to oscillographs for re-constructing part images, of the type arranged as referred to hereinbefore; or to iconoscopes or like apparatus.

In Fig. 2 the storage tracks are rectilinear and arranged one below the other with vertical intervals slightly larger than the actual height of the tracks. There may be a plurality of such transformer vessels, all preferably associated with their own amplifier system whereby the modulation frequency is effectively lowered to reasonable values. All the back-plates of the tracks in Fig. 2 may be connected together or a common signal plate and load resistor may be provided. The collector electrode or control electrode 7 is grid-shaped and close to the track-structure, whereby to prevent the scattering of the secondary electrons released, onto adjacent track portions.

When storing the cathode ray (S) (Fig. 2) may move uniformly in the horizontal direction, to charge in turn the various tracks (at the receiver) in response to incoming modulation, and in a desired sequence. After switch-over of modulation to another storage structure, the present storage beam may be arranged for pick-up (unless a separate beam for pick-up is provided) and caused to be deflected in the direction transverse to the lines. The vertical deflection is preferably sufficiently quick so that the horizontal motion in any track does not exceed one image point, and is preferably a fraction. The resultant multiplex signal across the common signal-resistor is arranged to modulate an associated main amplifier the latter conveniently of the secondary-electron multiplier type. The output stream of this amplifier may modulate a distributor electronic beam or system for the various output channels, or may be directly focused and deflected sequentially onto a number of target anodes associated with the various output channels, the latter equal in number to those which would have been required as "main" amplifier in the foregoing scan transformer systems whereby the system affords less expensive amplification of the signals picked up.

In the appended claims the expression "means for deflecting the scanning beam" or the like generally speaking is to be construed as including the whole of the means which contribute in defining the resultant beam impact point or path traced out including not only "main" deflection plates or coils with associated scanning generator or generators but diverse means for manual and automatic adjustment of deflection which may or may not be physically distinct, all substantially as set forth hereinbefore.

Although I have described and shown a few typical embodiments of my invention many modifications will suggest themselves to those skilled in the art.

What I claim is:

1. In an electrical system: means for producing an electron scanning beam; a target structure; means including a source of deflection-determining potentials for deflecting said scanning beam in predetermined manner across said target structure; means including said scanning beam and target structure operable at a predetermined point of said target structure for generating a voltage pulse in response to undesired shift of said scanning beam relative to said target point; means for applying said voltage pulse to a storage device of limited time constant to produce a correcting voltage with lengthened effect; and means responsive to said correcting voltage for so modifying beam deflection as to oppose said shift.

2. In an electrical system: means for producing an electron scanning beam; a target structure; means including a source of deflection-determining potentials for cyclically deflecting said beam in predetermined manner across said target structure over a preselected path; means including a control electrode positioned at a predetermined point of said path for generating a voltage pulse in response to undesired shift of said beam along said path; means for applying said voltage pulse to a storage device having limited time constant to produce a correcting voltage with lengthened effect; and means responsive to said correcting voltage for so modifying beam deflection as to oppose said shift.

3. In an electrical system: means for producing an electron scanning beam; a target structure; means including a source of deflection-determining potentials for cyclically deflecting said beam over said target structure substantially within an assigned boundary thereof; means including said beam and target structure responsive to undesired transgression of said scanning beam beyond said boundary for producing a correcting voltage pulse; means for applying said voltage pulse to a storage device with limited time constant to produce a correcting voltage with lengthened effect; and means responsive to said correcting voltage for so modifying beam deflection as to oppose said transgression.

4. In an electrical system: means for producing an electron scanning beam; a target structure; means including a source of deflection-determining potentials for cyclically deflecting said scanning beam substantially within an assigned boundary of said target structure; a target electrode so positioned as to be intermittently bombarded by electrons when said scanning beam transgresses beyond said boundary; means for producing a correction voltage in response to said intermittent bombardment of target electrode said means including a reservoir condenser provided with a leakage path and charged in response to said bombardment, and means responsive to said correcting voltage for so modifying beam deflection as to counteract said transgression.

5. In an electrical system: means for producing an electron scanning beam; a target structure; means including a source of deflection-determining potentials for cyclically deflecting said scanning beam substantially within an assigned boundary of said target structure; a target electrode so positioned as to be intermittently bombarded by electrons when said scanning beam transgresses beyond said boundary; means for producing a correction voltage in response to said intermittent bombardment of target electrode said means including a reservoir condenser provided with a leakage path and charged in response to said bombardment; and means for applying said correcting voltage to operate upon said beam to cause deflection so as to oppose said transgression.

6. In an electrical system: means for producing an electron scanning beam; a target structure; means including a source of deflection-determining potentials for cyclically deflecting said scanning beam substantially within an assigned boundary of said target structure; a target electrode so positioned as to be intermittently bombarded by electrons when said scanning beam transgresses beyond said boundary; means for producing a correction voltage in response to said intermittent bombardment of target electrode said means including a reservoir condenser provided with a leakage path and charged in response to said bombardment; and means responsive to said correction voltage comprising means for altering the magnitude of said deflection-determining potentials to oppose said transgression.

7. In an electrical system: means for producing an electron beam; a target structure; means including a source of deflection-determining potentials for deflecting said beam over said target structure substantially along a preselected path; means including said beam and target structure responsive to undesired deviations of said beam from said path for generating a correcting voltage; and means responsive to said correcting voltage and operative upon said electron beam for opposing said deviations.

8. In an electrical system: means for producing an electron scanning beam; means including a source of deflection-determining potentials for deflecting said scanning beam substantially along a preselected scanning path; a target electrode so positioned as to be bombarded by electrons of said beam in accordance with undesired deviation of said beam from said preselected scanning path; means for deriving a correcting voltage in response to said bombardment of target electrode; and means for utilizing said correcting voltage to modify beam deflection so as to counteract said deviation.

9. In an electrical system: means for producing an electron scanning beam; a target structure; means including a source of deflection-determining potentials for cyclically deflecting said scanning beam over said target structure substantially along a preselected scanning path; means operable at a predetermined point of said scanning path from the intermittent bombardment of said target structure by said scanning beam in response to unwanted deviation of said beam in the direction transverse to said path for generating a voltage pulse responsive to said deviation; means for applying said voltage pulse to a storage device with limited time constant to produce a correcting voltage corresponding to a lengthened effect of said pulse; and means for applying said correcting voltage to modify beam deflection to counteract said deviation.

10. In an electrical system: means for producing an electron scanning beam; means including a source of deflection-determining potentials for cyclically deflecting said beam substantially along a preselected scanning path; a target electrode so positioned at a predetermined point of said scanning path as to be intermittently bombarded by electrons of said beam in accordance with deviation of said beam at said point from the preselected scanning path; means for producing a correcting voltage said means including a storage condenser provided with a leakage path said condenser being charged in response to the said intermittent bombardment of the target electrode; and means for utilizing said correcting voltage and operative ion said beam to modify beam deflection to counteract said deviation.

11. In an electrical system: means for producing an electron scanning beam; a target structure; means including a source of deflection-determining potentials for deflecting said scanning beam over said target structure substantially along a preselected scanning path; means including a first portion of target structure adjoining said path for producing a control signal when said beam deviates in a predetermined direction from said preselected path; means including a second portion of target structure adjoining said path for producing a second control signal when said beam deviates in the opposite direction from said preselected path; and means for applying said first and second control signals in opposing relation to modify beam deflection to counteract said deviation.

12. In an electrical system: means for producing an electron scanning beam; means including a source of deflection-determining potentials for deflecting said scanning beam along a preselected path; a first target plate so positioned as to be bombarded by electrons of said beam in the event said beam deviates in a predetermined direction from the preselected path; a second target plate so positioned as to be bombarded by electrons of said beam in the event said beam deviates in the opposite direction from said preselected path; means for deriving a first correction signal from the bombardment of said first target plate by said electrons; means for deriving a second correction signal from the bombardment of said second target plate by said electrons; and means for applying said first and second correction signals in opposing relation to modify beam deflection to counteract said deviation.

13. In an electrical system: means for producing an electron scanning beam, means including a source of deflection-determining potentials for deflecting said scanning beam along a substantially preselected path, a pair of target electrodes adjoining said scanning path at a predetermined point thereof comprising a first electrode so positioned as to be intermittently bombarded by electrons from said beam in the event said beam deviates in a first direction from said path and a second electrode so positioned as to be intermittently bombarded in the event said beam deviates in the opposite direction; means for deriving correction voltage pulses in response to the intermittent bombardment of said first and of said second electrode respectively; storage means with limited time constant connected to said correction pulse deriving means to extend the correction duration of said pulses as compared with the duration of said bombardment, and means for utilizing said extended correction pulses in opposing relation to alter beam deflection so as to oppose said deviations.

14. In an electrical system: means for producing an electron scanning beam; means including a source of deflection-determining potentials for deflecting said scanning beam substantially along a preselected scanning path comprised of a plurality of spaced substantially parallel path portions; a target electrode structure comprising interconnected electrode elements adjoining said path portions each so positioned as to be bombarded by electrons of said beam in accordance with undesired deviation of said beam from the respective portion of preselected path; means for deriving a correction voltage in response to said bombardment of target electrode; and means for applying said correction voltage to alter beam deflection to counteract said deviation.

15. In an electrical system: means for producing an electron scanning beam; means including a source of deflection-determining potentials for deflecting said beam along a plurality of predetermined substantially parallel scanning paths; a plurality of pairs of target electrodes individually associated with said scanning paths comprising a plurality of odd electrodes each so positioned as to be bombarded by electrons of said beam in the event said beam deviates in a first direction from the respectively scanning path, and a plurality of even electrodes each so positioned as to be bombarded by electrons in the event said beam deviates in the opposite direction from the respective scanning path; means connecting respectively said odd and even electrodes; means for deriving correction signals from the bombardment of said odd and even electrode respectively associated with the path being scanned; and means for applying said correction signals in opposite relation to beam deflection to alter said deviations.

16. In an electrical system: means for producing an electron; a target structure; deflection means including main deflection force developing means for deflecting said beam over said target structure along a substantially preselected deflection path onto any of a plurality of preselected portions of said target structure; means responsive to unwanted shift of said beam relative to the respective one of said target portions onto which said beam is deflected operating in response to the bombardment of said target structure by said beam for producing a correction voltage characteristic of said shift; and means for applying said correction voltage to alter beam deflection to counteract said shift.

17. In an electrical system: means for producing an electron beam; a target structure; deflection means including main deflection force developing mean for deflecting said beam over said target structure along a substantially preselected path onto any of a plurality of preselected portions of said target structure; a plurality of interconnected target electrodes individually associated with said target portions each so positioned as to be bombarded by electrons of said beam in the event said beam assumes unwanted shift relative to the respective target portion; means for developing a correction voltage characteristic of said shift in response to said bombardment of target electrode; and means operative upon said electron beam for so modifying the deflection as to oppose said shift.

18. In an electrical system: means for producing an electron beam; a target structure; deflection means including main deflection force developing means for deflecting said beam over said target structure along a preselected path onto any of a plurality of preselected portions of said target structure; a plurality of pairs of target electrodes individually associated with said target portions comprising odd electrodes each so positioned as to be bombarded by electrons of said beam in the event said beam assumes unwanted shift in a first direction relative to the associated target portion, and even electrodes each so positioned at its respective target area as to be bombarded by electrons of said beam in the event said beam assumes unwanted shift in the opposite direction when deflected on said target area; means connecting respectively said odd and even electrodes of said electrode pairs; means for deriving correction signals in response to the bombardment of the odd and even electrode respectively that are associated with the target area onto which the beam is deflected; and means for applying said correction signals in opposing relation to alter beam deflection to counteract said shift.

19. In an electrical system: means for producing an electron scanning beam, deflection means including main deflection force developing means for deflecting said scanning beam over a plurality of spaced substantially parallel scanning paths, a plurality of interconnected target electrodes individually associated with said scanning paths each so positioned at a predetermined point of the respective path as to be intermittently bombarded by electrons of said beam in response to undesired deviation at the respective point from the scanning path followed by said beam, means for producing a correction signal in response to said intermittent bombardment of electrons said means including a storage device with limited time constant for extending the duration of said correction signal as compared with the duration of said bombardment, and means for so applying said extended correction signal to beam deflection so as to alter said deviation.

20. The method of automatically controlling the condition of an electron beam system which comprises, generating an electron scanning beam, deflecting said beam in substantially predetermined manner over a scanning path; deriving from said scanning beam at a predetermined point of said path a correction signal in response to the position of said beam with respect to said point and characteristic of unwanted shift of said beam relative to said point; and applying said correction signal to operate upon said beam so as to oppose said shift.

EGON NICOLAS MULLER.

REFERENCES CITED

The following references are of record in the file of this patent:

UNITED STATES PATENTS

| Number | Name | Date |
|---|---|---|
| 1,719,756 | Clay | July 2, 1929 |
| 1,976,400 | Ilberg | Oct. 9, 1934 |
| 1,987,686 | Kewartin | Jan. 15, 1935 |
| 2,084,700 | Ogloblinsky | June 22, 1937 |
| 2,098,598 | Schroter | Nov. 9, 1937 |
| 2,146,876 | Zworykin | Feb. 14, 1939 |
| 2,204,055 | Skellett | June 11, 1940 |
| 2,457,911 | Munster | Jan. 4, 1949 |
| 2,490,812 | Huffman | Dec. 13, 1949 |

FOREIGN PATENTS

| Number | Country | Date |
|---|---|---|
| 434,890 | Great Britain | Sept. 11, 1935 |
| 434,891 | Great Britain | Sept. 11, 1935 |
| 653,467 | Germany | Nov. 24, 1937 |
| 793,556 | France | Nov. 23, 1935 |
| 821,449 | France | Aug. 23, 1937 |